(12) United States Patent
Xia et al.

(10) Patent No.: US 12,438,589 B2
(45) Date of Patent: Oct. 7, 2025

(54) WIRELESS SIGNAL TRANSMISSION AND RECEPTION FOR DEVICE TO DEVICE COMMUNICATION

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Seongnam-si (KR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 17/760,423

(22) PCT Filed: Feb. 19, 2020

(86) PCT No.: PCT/US2020/018790
§ 371 (c)(1),
(2) Date: Aug. 9, 2022

(87) PCT Pub. No.: WO2020/093074
PCT Pub. Date: May 7, 2020

(65) Prior Publication Data
US 2023/0094596 A1    Mar. 30, 2023

(51) Int. Cl.
*H04B 7/06* (2006.01)
*H04B 7/08* (2006.01)
*H04W 24/08* (2009.01)

(52) U.S. Cl.
CPC .......... *H04B 7/0695* (2013.01); *H04B 7/088* (2013.01); *H04W 24/08* (2013.01)

(58) Field of Classification Search
CPC ...... H04B 7/0695; H04B 7/088; H04W 24/08

USPC .......................................................... 370/329
See application file for complete search history.

(56) References Cited

U.S. PATENT DOCUMENTS

| 2010/0279616 | A1* | 11/2010 | Jin | H04W 16/28 455/62 |
| 2012/0165040 | A1* | 6/2012 | Lee | H04W 64/00 455/456.1 |
| 2014/0185481 | A1 | 7/2014 | Seol et al. | |
| 2015/0126209 | A1* | 5/2015 | Gloss | H04W 72/542 455/452.1 |

(Continued)

FOREIGN PATENT DOCUMENTS

| WO | 2019054908 A1 | 3/2019 |
| WO | 2019243449 A2 | 12/2019 |

*Primary Examiner* — Robert J Lopata
(74) *Attorney, Agent, or Firm* — Slater Matsil, LLP (57) ABSTRACT

A computer-implemented method for wireless signal transmission and reception for device to device (D2D) communication includes obtaining, by a first electronic device, reference signal beam pattern information associated with multiple beam directions of a second electronic device, where the reference signal beam pattern information is stored in a beam pattern database (BPD) in the first electronic device, receiving or transmitting, between the first and second electronic devices, a plurality of reference signals in accordance with the reference signal beam pattern information, and determining, by the first electronic device, environment information surrounding the first electronic device and the second electronic device based on measurements of the reference signals, the obtained reference signal beam pattern information, and the BPD.

21 Claims, 3 Drawing Sheets (56) References Cited

U.S. PATENT DOCUMENTS

| | | | |
|---|---|---|---|
| 2015/0304868 A1 | 10/2015 | Yu et al. | |
| 2016/0066312 A1* | 3/2016 | Centonza | H04W 72/27 |
| | | | 370/329 |
| 2016/0255604 A1* | 9/2016 | Venkatraman | G01S 5/02524 |
| | | | 455/456.1 |
| 2017/0257243 A1 | 9/2017 | Sahlin et al. | |
| 2018/0192432 A1 | 7/2018 | Tenny et al. | |
| 2018/0220448 A1 | 8/2018 | Akkarakaran et al. | |
| 2019/0081688 A1 | 3/2019 | Deenoo et al. | |
| 2019/0277635 A1* | 9/2019 | Weisbrod | H04B 17/3913 |
| 2019/0363803 A1 | 11/2019 | Tong et al. | |
| 2019/0364492 A1* | 11/2019 | Azizi | H04L 67/52 |
| 2020/0169312 A1* | 5/2020 | Black | H04W 88/085 |
| 2020/0187172 A1* | 6/2020 | Wang | H04B 7/0617 |
| 2020/0227825 A1* | 7/2020 | Hosseini | H04B 7/0695 |
| 2020/0406471 A1* | 12/2020 | Rácz | B25J 9/0084 |
| 2021/0099224 A1* | 4/2021 | Yeo | H04B 7/088 |
| 2021/0109145 A1* | 4/2021 | Haustein | H04B 17/318 |
| 2021/0345129 A1* | 11/2021 | Gupta | H04W 16/18 |
| 2021/0359747 A1* | 11/2021 | Islam | H04B 7/061 |
| 2022/0271818 A1* | 8/2022 | Svendsen | H04B 7/0897 |
| 2022/0283257 A1* | 9/2022 | Cho | G01S 1/045 |
| 2022/0308154 A1* | 9/2022 | Hong | G01S 3/16 |
| 2023/0337222 A1* | 10/2023 | Furuyama | H04W 72/40 |

* cited by examiner

WIRELESS SIGNAL TRANSMISSION AND RECEPTION FOR DEVICE TO DEVICE COMMUNICATION

PRIORITY CLAIM

This application is a national phase filing under section 371 of PCT Application No. PCT/US2020/018790, filed on Feb. 19, 2020 and entitled "Wireless Signal Transmission and Reception for Device to Device Communication," which is hereby incorporated by reference herein as if reproduced in its entirety.

TECHNICAL FIELD

This disclosure relates to wireless signal transmission and reception, particularly, for device to device (D2D) communication.

BACKGROUND

In D2D communication, both devices in the D2D communication may work in the millimeter wave frequency band and use analog, digital, or hybrid beamforming to transmit and receive signals. Expediting beam management process in D2D communication may be desirable.

SUMMARY

The present disclosure describes wireless signal transmission and reception for device to device (D2D) communication.

In a first implementation, a method includes: obtaining, by a first electronic device, reference signal beam pattern information associated with a plurality of beam directions of a second electronic device, that is then stored a beam pattern database (BPD) in the first electronic device, receiving or transmitting, between the first and second electronic devices, a plurality of reference signals in accordance with the reference signal beam pattern information, and determining, by the first electronic device, environment information surrounding the first electronic device and the second electronic device based on measurements of the reference signals, the obtained reference signal beam pattern information, and the BPD.

In a second implementation, a first electronic device includes: a non-transitory memory storage comprising instructions; and one or more hardware processors in communication with the memory storage, where the one or more hardware processors execute the instructions to perform operations comprising: obtaining reference signal beam pattern information associated with a plurality of beam directions of a second electronic device, that is then stored in a beam pattern database (BPD) in the first electronic device, receiving or transmitting, between the first and second electronic devices, a plurality of reference signals in accordance with the reference signal beam pattern information, and determining, based on the obtained reference signal beam pattern information and the BPD, environment information surrounding the first electronic device and the second electronic device.

In a third implementation, a non-transitory computer-readable medium storing computer instructions, that when executed by one or more hardware processors, cause the one or more hardware processors to perform operations including: obtaining, by a first electronic device, reference signal beam pattern information associated with a plurality of beam directions of a second electronic device, that is then stored in a beam pattern database (BPD) in the first electronic device, receiving or transmitting, between the first and second electronic devices, a plurality of reference signals in accordance with the reference signal beam pattern information, and determining, by the first electronic device, environment information surrounding the first electronic device and the second electronic device based on measurements of the reference signals, the obtained reference signal beam pattern information, and the BPD.

In a fourth implementation, a method includes: determining, by a second electronic device, indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

In a fifth implementation, a second electronic device includes: a non-transitory memory storage comprising instructions; and one or more hardware processors in communication with the memory storage, where the one or more hardware processors execute the instructions to perform operations comprising: determining indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

In a sixth implementation, a non-transitory computer-readable medium storing computer instructions, that when executed by one or more hardware processors, cause the one or more hardware processors to perform operations including: determining, by a second electronic device, indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

The following detailed description describes wireless signal transmission and reception for device to device (D2D) communication and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

The fifth generation (5G) New Radio (NR) system uses millimeter wave frequency (e.g. 28 GHz) to exploit greater bandwidth to improve throughput, reduce latency, and increase spatial reuse. In D2D communication, both devices in the D2D communication may work in the millimeter wave frequency band and use analog or digital or hybrid beamforming to transmit and receive signals. By learning the environment through, for example, measurements, reports, or both, a device in the D2D communication can enable fast device discovery, beam management, and satisfactory user experience. Although this disclosure has been described in terms of D2D communication, the subject matter of this document can be applied to general downlink/uplink communication.

The present disclosure describes example implementations of wireless signal transmission and reception for D2D communication. In the present disclosure, a first electronic device can obtain reference signal beam pattern information of multiple beam directions from a second electronic device. In some implementations, the first and second electronic devices can maintain a common beam pattern database (BPD). The first electronic device can determine environment information surrounding the first electronic device and the second electronic device based on the reference signal beam pattern information and the BPD. The environment information can, for example, be used to facilitate data transmissions, beam management, or both, for future communication sessions between the first and second electronic devices at new locations within the environment.

The subject matter described in the present disclosure can be implemented in particular implementations so as to realize one or more of the following advantages. First, the described approach can enable an electronic device to learn the environment through the help of a peer that maintains a same BPD as the electronic device. Second, the described approach can enable the electronic device to expedite device discovery, beam management, and beam failure recovery using the learned environment. Third, user experience can be improved when the electronic device operates at high frequency in D2D communication. Other advantages will be apparent to those of ordinary skill in the art.

Figure 1:
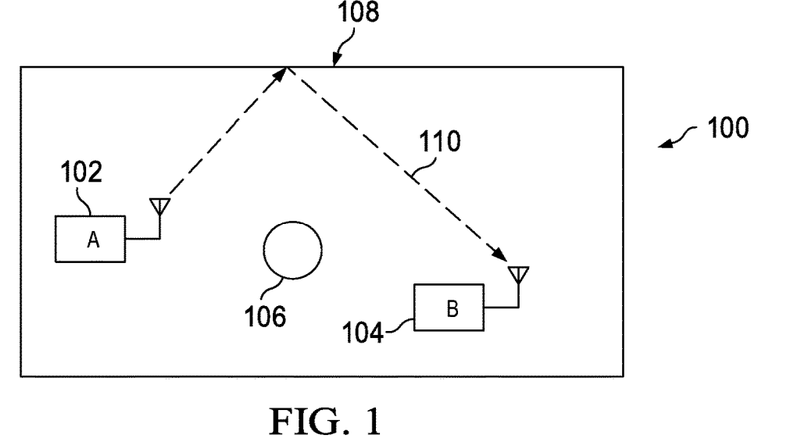
FIG. 1 is a block diagram illustrating an example environment for device to device (D2D) communication, according to an implementation.

FIG. 1 is a block diagram illustrating an example environment 100 for device to device (D2D) communication, according to an implementation. The example environment wo includes device A 102, device B 104, an obstacle 106, and a wall 108. For example, the device A 102 communicates with the device B 104 through a D2D link no. In some implementations, additional, different, or fewer devices, obstacles, or both, can be included in the example environment mo.

An environment surrounding the device A 102 and the device B 104 can include reflectors and obstacles (or blockages). For example, the environment can be a residential home, an office space, a community center, or other structure. In some implementations, the size of the environment or a distance between the device A 102 and the device B 104 can be smaller than 100, 50, or 10 meters. The reflectors can reflect radio waves. For example, the reflectors can be walls (e.g., the wall 108), ceiling, floor, and furniture. The position, orientation, and distance of the reflectors relative to the device A 102 and the device B 104 can affect the D2D transmission between the device A 102 and the device B 104. The obstacles (e.g., the obstacle 106) can block radio waves. The direction and distance of the obstacles relative to the device A 102 and the device B 104 can affect the D2D transmission between the device A 102 and the device B 104.

In some implementations, knowledge of the environment can be acquired with the aid of both the device A 102 and the device B 104. The device A 102 and the device B 104 can be at different places at different times. For example, if the device A 102 is more stationary than the device B 104, the knowledge of the environment can be kept fine-tuned by the device A 102. The knowledge of the environment can be used to facilitate data transmissions, beam management, or both for future sessions between the device A 102 and the device B 104, possibly at new positions within the environment.

A device can be, for example, a phone, a TV, a laptop, a pad, a router, a smart speaker (e.g. AMAZON ALEXA), a smart monitor, or a smart camera. Some devices may be relatively stationary within the environment (e.g., a TV, a smart monitor, and a router). Some devices may be frequently moved within the environment (e.g., a phone).

For example, the device A 102 (e.g., a TV, which is usually stationary in a room) can create (or maintain) a reflector environment database (RED) for the environment. If the device A 102 is moved to a new room, a new RED can be created. The device A 102 can build the RED based on measurements (e.g., measurements of the device B 104's signal), reports (e.g., measurements of the device A 102's signal reported by the device B 104), or both.

In some implementations, the device A 102, at a fixed location, can initiate a measurement/report session with the device B 104. It is assumed that the device B 104 will not move before the measurement/report session is completed. If the device B 104 moves before the measurement/report session is completed, the measurement/report session may be terminated (e.g., labeled as incomplete). In some implementations, some measurements/reports in an incomplete measurement/report session can be used partially to build the RED. For example, in a measurement session, the device B 104 can send out reference signals, potentially from multiple beam directions of the device B 104, and the device A 102 can perform measurements using potentially multiple beam directions of the device A 102. In a report session, the device A 102 can send out reference signals, potentially from multiple beam directions of the device A 102, and the device B 104 can perform measurements using potentially multiple beam directions of the device B 104 and report the measurements to the device A 102.

Figure 2:
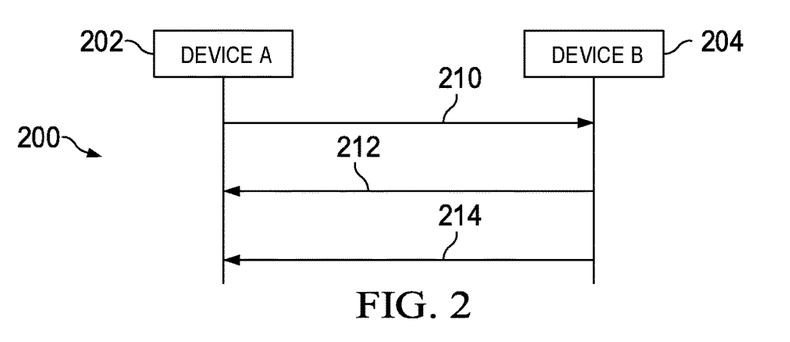
FIG. 2 is a swim diagram illustrating an example method for wireless signal transmission and reception for D2D communication, according to an implementation.

FIG. 2 is a swim diagram illustrating an example method 200 for wireless signal transmission and reception for D2D communication, according to an implementation. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 210, device A 202 initiates a measurement session by transmitting control signals (e.g., reference signal measurement configurations) to device B 204. The control signals can be used to configure reference signals to be transmitted by the device B 204. For example, at least one of reference signal time, location, or power setting can be configured based on the control signals.

At 212, the device B 204 transmits beam pattern information (e.g., indications of the exact or approximate transmit beam patterns of T_B_1, . . . , T_B_N) to the device A 202. This can be in the form of indexes corresponding to the beam patters, data indicating characteristics of the beam patterns (such as angle, gain, etc.), or other forms. In some implementations, the device B 204 can transmit the beam pattern information to the device A 202 after transmitting reference signals to the device A 202 instead of before. In some implementations, after receiving the beam pattern information from the device B 204, the device A 202 can perform measurement using multiple beam directions of the device A 202 based on the beam pattern information.

At 214, the device B 204 transmits reference signals to the device A 202. The reference signals can be configured based on the control signals. For example, the device B 204 can transmit the reference signals on one or more of frequency locations, time locations, and power settings of an orthogonal frequency-division multiplexing (OFDM) modulation based on the control signals. In some implementations, the reference signals can be transmitted by the device B 204 from multiple beam directions of the device B 204 (e.g., different transmit beam patterns of T_B_1, . . . , T_B_N).

In some implementations, if two devices in a D2D communication are made by different manufacturers, one device will not inform the other device of its transmit beam patterns because implementation details of beam patterns are usually hidden and different from external parties. In some implementations, for indoor D2D communication, two devices may be made by a same manufacturer. In this case, the two devices can share a same beam pattern database (BPD) internally. If a device then signals any beam pattern index in the BPD, the other device can know the corresponding beam pattern using the BPD. Thus, the beam pattern information can be in the form of indexes.

For example, the device A 202 and the device B 204 share (or maintain) a same BPD. In some implementations, the BPD can include a one-to-one mapping between the transmit beam patterns and the receive beam patterns. For example, a receive beam pattern can be equivalent/equal to a corresponding transmit beam pattern. After receiving the beam pattern information from the device B 204 (e.g., indexes of N transmit beam patterns of T_B_1, . . . , T_B_N known from the BPD), the device A 202 can determine corresponding receive beam patterns (e.g., N receive beam patterns of R_A_1, . . . , R_A_N corresponding to the N transmit beam patterns of T_B_1, . . . , T_B_N) that can be used to receive signals transmitted by device B using each transmit beam pattern. The device A 202 then has information of the transmit beam patterns, the corresponding receive beam patterns, and the corresponding signal measurement results (e.g., reference signal received power (RSRP), reference signal received quality, signal to noise ratio (SNR), etc.) for each reference signal transmitted by device B. For each transmit beam and receive beam pair, the corresponding signal measurement result can include multiple results (e.g., multiple SNR on multiple frequency tones, multiple RSRP on multiple frequency tones, etc.). The device A 202 can then use this information to perform a calculation of the environment. For example, the device A 202 can determine that an obstacle exists in a particular direction relative to the device A 202. The device A 202 can also determine a distance between the obstacle and the device A 202 and a size of the obstacle based, for example, on the directions of receive and transmit beams that are blocked by the obstacle. For example, if a beam of device A appears to be blocked over a 10 degree span, then the obstacle might be small or far away. However, if the same obstacle appears to block beams from device B over a 90 degree span, then the obstacle may actually be larger and/or closer to device B than to device A. Similarly, unblocked beams between device A and device B separated by, for example 90 degrees, with an obstacle in-between may indicate one or more reflectors in the environment. Multiple measurements from multiple beams, using devices at multiple locations can be used in this manner to gradually develop a more accurate understanding of the environment using similar techniques. With knowledge of the environment, the device A 202 can achieve fast device discovery and beam management with other devices, including the device B 204 moving to a different location, thereby providing satisfactory user experience.

Figure 3:
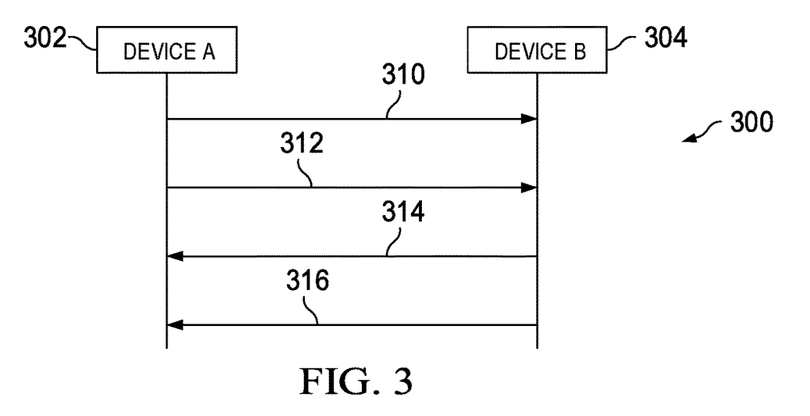
FIG. 3 is a swim diagram illustrating another example method for wireless signal transmission and reception for D2D communication, according to an implementation.

FIG. 3 is a swim diagram illustrating another example method 300 for wireless signal transmission and reception for D2D communication, according to an implementation. For clarity of presentation, the description that follows generally describes method 300 in the context of the other figures in this description. However, it will be understood that method 3 00 can be performed, for example, by any system, environment, software, and hardware, or a combination of systems, environments, software, and hardware, as appropriate. In some implementations, various steps of method 300 can be run in parallel, in combination, in loops, or in any order.

At 310, device A 302 initiates a report session by transmitting control signals (e.g., reference signal measurement configurations) to device B 304. The control signals can be used to configure reference signals to be transmitted by the device A 302. For example, at least one of reference signal type, reference signal time, frequency location, or transmit power setting can be configured based on the control signals.

At 312, the device A 302 transmits reference signals to the device B 304. The reference signals can be configured based on the control signals. For example, the device A 302 can transmit the reference signals on one or more of frequency locations, time locations, and power settings of an OFDM modulation based on the control signals. In some implementations, the reference signals can be transmitted by the device A 302 from multiple beam directions of the device A 302 (e.g., different transmit beam patterns of T_A_1, . . . , T_A_N).

At 314, the device B 304 transmits, to the device A 302, beam pattern information (e.g., indications of the exact or approximate receive beam patterns of R_B_1, . . . , R_B_N) used at the device B 304 to receive the reference signals. In some implementations, the device B 304 can transmit the beam pattern information to the device A 302 after reporting the signal measurement results to the device A 302 instead of before. Further, in some implementations, the device B 304 can receive the beam pattern information from the device A 302 (for example, with the control signals at 310), such that device A can already have this information.

At 316, the device B 304 performs measurement using multiple beam directions of the device B 304 (e.g., different receive beam patterns of R_B_1, . . . , R_B_N corresponding to the different transmit beam patterns of T_A_1, . . . , T_A_N) based on the control signals, and reports signal measurement results to the device A 302. For example, the control signals can indicate to device B 304 which receive beam pattern(s) to use for each reference signal, also corresponding to when device A 302 uses a particular transmit beam pattern. The measurement results can be transmitted from device B 304 to device A 302.

In some implementations, if two devices in a D2D communication are made by different manufacturers, one device will not inform the other device of its transmit beam patterns because implementation details of beam patterns are usually hidden and different from external parties. In some implementations, for indoor D2D communication, two devices may be made by a same manufacturer. In this case, the two devices can share a same beam pattern database (BPD) internally. If a device signals any beam pattern index in the BPD, the other device can know the corresponding beam pattern.

For example, the device A 302 and the device B 304 share (or maintain) a same BPD. In some implementations, the BPD can include a mapping relationship between transmit beam patterns and receive beam patterns (such as, a one-to-one mapping). After receiving the signal measurement results and the beam pattern information from the device B 304 (e.g., N receive beam patterns of R_B_1, . . . , R_B_N), the device A 302 has information of the transmit beam patterns, the receive beam patterns, and the corresponding signal measurement results (e.g., RSRP, reference signal received quality, SNR, etc.). For each transmit beam and receive beam pair, the corresponding signal measurement result can include multiple results (e.g., multiple SNR on multiple frequency tones, multiple RSRP on multiple frequency tones, etc.). The device A 302 can then use this information to perform a calculation of the environment, as previously discussed with reference to FIG. 2. For example, the device A 302 can determine that an obstacle exists in a particular direction of the device A 302. The device A 302 can also determine a distance between the obstacle and the device A 302 and a size of the obstacle. With knowledge of the environment, the device A 302 can achieve fast device discovery and beam management with other devices, including the device B 304 moving to a different location, thereby providing satisfactory user experience.

In some implementations, utilizing only a measurement session (e.g., method 200 in FIG. 2) can be sufficient for a device to learn the environment. In some implementations, utilizing only a report session (e.g., method 300 in FIG. 3) can also be sufficient for a device to learn the environment.

In some implementations, utilizing both a measurement session and a report session can be useful for a device to learn the environment. For example, both sessions can be used to perform implicit beam calibration and to remove errors (or artifacts) due to imbalanced transmit and receive beams. If a certain transmit beam is slightly different between its actual beam pattern (which will directly impact the measurement results) and its nominal beam pattern (which is contained in the beam pattern database), calculation based on a single session can lead to undesirable error, and thus to undesirable beam management inconsistency or inefficiency.

In general 5G NR communications, beam patterns are not shared between a transmitter and a corresponding receiver. In this specification, devices can have access to a common beam pattern database (BPD). In some implementations, a device (e.g., device B 204 in FIG. 2) can have a small limited number of transmit/receive beams in total. For example, a device can have 4 antenna elements. Each antenna element is controlled by a 2-bit phase shifter. As a result, the device is able to form $4^4=256$ beams in total. Some of the 256 beams may be the same. In this case, the BPD may have up to 256 entries. In some implementations, a device (e.g., device B 304 in FIG. 3) can have a large number of transmit/receive beams in total. For example, a device can have 16 antenna elements. Each antenna element is controlled by a 6-bit phase shifter. As a result, the device is able to form $64^{16}$ beams in total. Some of the beams may be the same. In this case, it is very difficult to have a BPD with $64^{16}$ entries, and it is up to implementation of transmit/receive to decide on the size of the BPD.

In some implementations, each entry of a BPD can include one or more coefficient value, beam pattern index, 1st beam peak direction/position (e.g., 30 degree northwest relative to a reference direction), 1st beam peak strength/gain (e.g., 10 dBi), 1st beam width (e.g., 20 degree for 3 dB beamwidth), 2nd beam peak direction/position, 2nd beam peak strength/gain, and 2nd beam width. In some implementations, additional entries on other peaks/nulls can be included in the BPD to reduce storage requirement for the BPD, as well as to reduce computation complexity of the environment. The one or more coefficient value can be phase control shifter value used to form the beam of the particular entry. In some implementations, the one or more coefficient value may not be included in the BPD explicitly. The beam direction, beam width, and beam gain can be measured and recorded based on the one or more coefficient value. In some implementations, the beam direction, beam width, and beam gain are included in the BPD explicitly.

In some implementations, a common BPD can be shared between devices offline (e.g., during manufacturing stage) if the devices are of a same brand. In some implementations, a common BPD can be shared between devices online. For example, a device can send its BPD information (for example, information regarding its own beam patterns) to another device in a single high layer session (e.g., one-shot sharing). The device can also send partial entries of its BPD to another device in multiple sessions (e.g., multiple shot sharing). The another device can store the received entries of the BPD, and form a database of its own. Once a common BPD is shared between devices, a device can report only BPD indexes, instead of a description of the beam patterns, to another device during a measurement session, a report session, or a measurement and report session.

Figure 4:
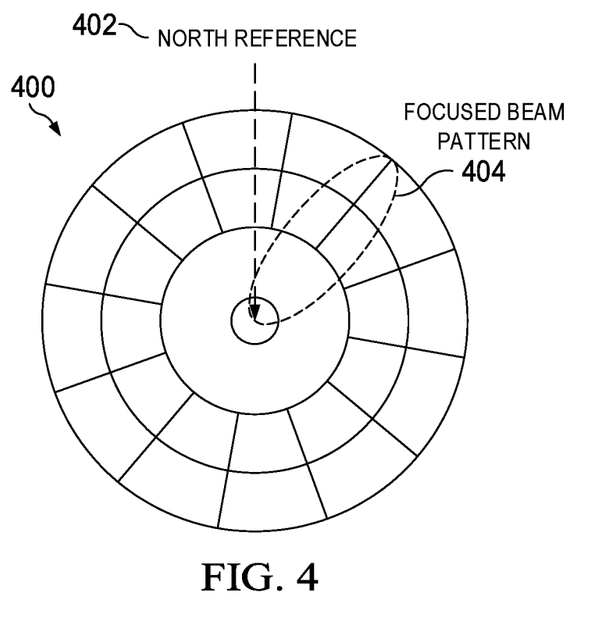
FIG. 4 is a graph illustrating an example beam pattern with a common reference direction (CRD), according to an implementation.

FIG. 4 is a graph 400 illustrating an example beam pattern with a common reference direction (CRD), according to an implementation. In some implementations, beam patterns in a BPD can use a CRD to define the beam's directions. As illustrated in FIG. 4, the absolute north direction can serve as a reference (e.g., North Reference 402) in the azimuth domain. For example, a device can understand that another device is transmitting using transmit beam pattern 404 in the northeast 45 direction (e.g., indexed by an explicit beam pattern) relative to the absolute north direction (e.g., an implicit reference).

In some implementations, the gravity-up direction can serve as a reference in the vertical domain. For example, a device can understand that another device is transmitting using transmit beam pattern T_B_1 in the upward 30 degree direction (e.g., indexed by an explicit beam pattern) relative to the gravity-up direction (e.g., an implicit reference).

In some implementations, with a fixed orientation, exchanging beam patterns (e.g., via beam pattern index within a common BPD) can facilitate device discovery, beam management, or both. If a device has a different orientation, beam patterns read from the common BPD using beam pattern index need to be adjusted by the device's physical orientation. In general, the common BPD is created with a reference orientation aligned with the CRD. In some implementations, in addition to beam pattern index, a device may also need to send its orientation (e.g., obtained through magnetometer measurements) to another device. Upon receiving device orientation information (DOI) of the device, another device can adjust beam pattern of the device properly, and take the information into account when calculating the environment (e.g., obstacle calculation, reflector calculation, etc.).

With a common BPD shared between devices and exchanging beam pattern indices between the devices, a device can learn the environment by performing reference signal measurements, receiving reference signal measurement reports from a peer device, or both. In doing so, the environment information can help the device in expedite device discovery, beam management, beam failure recovery, and thereby improving user experience while operating at high frequency.

Figure 5:
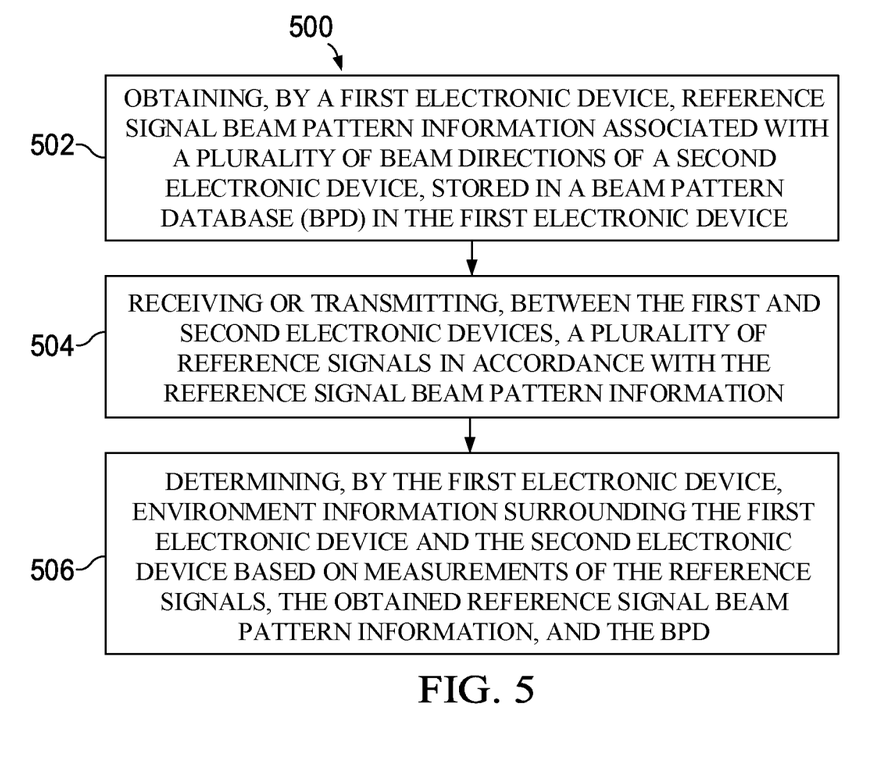
FIG. 5 is a flow diagram illustrating an example method for wireless signal transmission and reception for D2D communication, according to an implementation.

FIG. 5 is a flow diagram illustrating an example method 500 for wireless signal transmission and reception for D2D communication, according to an implementation. For clarity of presentation, the description that follows generally describes method 500 in the context of the other figures in this description. The method 500 can be implemented by an electronic device, e.g., device A 102 illustrated in FIG. 1. However, it will be understood that the method 500 may be performed, for example, by any suitable system, environment, software, and hardware, or a combination of systems, environments, software, and hardware, as appropriate. In some implementations, various steps of the method 500 can be run in parallel, in combination, in loops, or in any order.

The method 500 begins at 502, where a first electronic device obtains reference signal beam pattern information associated with a plurality of beam directions of a second electronic device. In some implementations, the reference signal beam pattern information can be obtained from the second electronic device. In some implementations, the reference signal beam pattern information can be obtained from a beam pattern database (BPD) stored in the first electronic device. The BPD can be stored in at least one of the first electronic device and the second electronic device. For example, the first electronic device or the second electronic device can store the BPD. In some implementations, both the first electronic device and the second electronic device can be manufactured by a same manufacturer, and share or maintain a same BPD internally. In some implementations, the BPD can include a mapping relationship between transmit beam patterns and receive beam patterns. In some implementations, the BPD can include a plurality of entries. Each of the plurality of entries can include at least one of a beam index, a beam peak direction, or a beam peak gain.

In some implementations, the first electronic device can be one of a smart TV, a router, and a smart speaker. The second electronic device can be one of a smartphone and a tablet. In some implementations, the first electronic device can be more stationary than the second electronic device. In some implementations, the first electronic device can communicate with the second electronic device through device-to-device (D2D) communication.

At 504, a plurality of reference signals in accordance with the reference signal beam pattern information can be received or transmitted between the first and second electronic devices.

In some implementations, the first electronic device can transmit control signals to the second electronic device. The control signals can be used to configure reference signals to be transmitted by the second electronic device with a plurality of transmit beam patterns. The first electronic device then can measure, using a plurality of receive beam patterns corresponding to the plurality of transmit beam patterns, the reference signals transmitted by the second electronic device with the plurality of transmit beam patterns.

In some implementations, the first electronic device can transmit control signals to the second electronic device. The control signals can be used to configure reference signals to be transmitted by the first electronic device with a plurality of transmit beam patterns. The first electronic device can transmit, to the second electronic device, the reference signals with the plurality of transmit beam patterns. The first electronic device can receive, from the second electronic device, beam measurement results. The beam measurement results can be measured, by the second electronic device and using a plurality of receive beam patterns corresponding to the plurality of transmit beam patterns, on the reference signals transmitted by the first electronic device with the plurality of transmit beam patterns.

At 506, the first electronic device determines environment information surrounding the first electronic device and the second electronic device based on measurements of the reference signals, the obtained reference signal beam pattern information, and the BPD. For example, the first electronic device can determine that an obstacle exists in a direction of the first electronic device between the first electronic device and the second electronic device. In some implementations, the first electronic device and the second electronic device are stationary when the first electronic device obtains the reference signal beam pattern information and determines the environment information.

Figure 6:
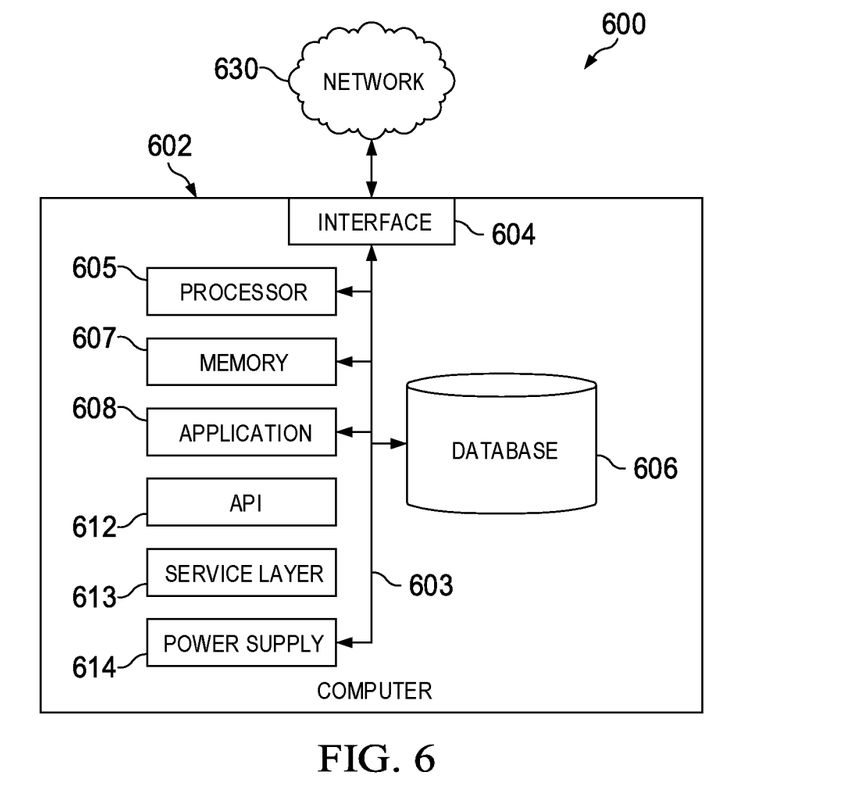
FIG. 6 is a block diagram of an example computer system used to provide computational functionalities associated with described algorithms, methods, functions, processes, flows, and procedures, as described in the instant disclosure, according to an implementation.

FIG. 6 is a block diagram of an example computer system 600 used to provide computational functionalities associated with described algorithms, methods, functions, processes, flows, and procedures, as described in the instant disclosure, according to an implementation. The computer system 600, or more than one computer system 600, can be used to implement the electronic device described previously in this disclosure, e.g., device A 102 illustrated in FIG. 1.

In some aspects, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include, or be communicably coupled with, an application server, e-mail server, web server, caching server, streaming data server, or other server (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access methods), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable formats. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 includes logic encoded in software or hardware (or a combination of software and hardware) and is operable to communicate with the network 630. More specifically, the interface 604 may include software supporting one or more communication protocols associated with communication such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602.

The computer 602 also includes a memory 607 that can hold data for the computer 602 or other components (or a combination of both) that can be connected to the network 630 (whether illustrated or not). For example, memory 607 can be Random Access Memory (RAM), Read-Only Memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or a combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

Figure 7:
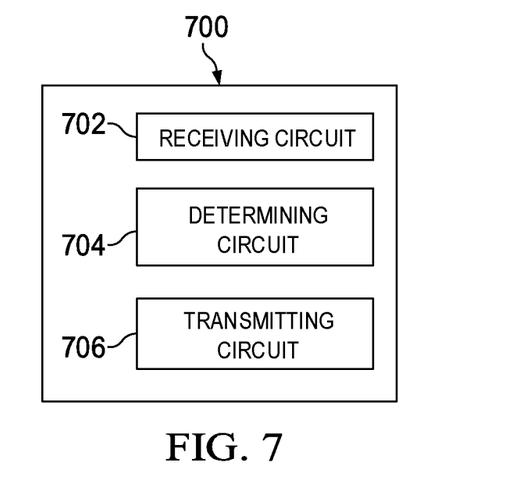
FIG. 7 is a schematic diagram illustrating an example structure of a terminal described in the present disclosure, according to an implementation.

FIG. 7 is a schematic diagram illustrating an example structure of a terminal 700 described in the present disclosure, according to an implementation. The terminal 700 includes a receiving circuit 702, a determining circuit 704, and a transmitting circuit 706. In some implementations, terminal 700 can further include one or more circuits for performing any one or a combination of steps described in the present disclosure.

The receiving circuit 702 is configured to receive reference signals transmitted by another terminal using a plurality of receive beam patterns.

The determining circuit 704 is configured to determine environment information surrounding the terminal and the another terminal.

The transmitting circuit 706 is configured to transmit control signals to the another terminal. The control signals can be used to configure reference signals to be transmitted by the another terminal with a plurality of transmit beam patterns.

Described implementations of the subject matter can include one or more features, alone or in combination.

In a first implementation, a method includes: obtaining, by a first electronic device, reference signal beam pattern information associated with a plurality of beam directions of a second electronic device, that is then stored in a beam pattern database (BPD) in the first electronic device, receiving or transmitting, between the first and second electronic devices, a plurality of reference signals in accordance with the reference signal beam pattern information, and determining, by the first electronic device, environment information surrounding the first electronic device and the second electronic device based on measurements of the reference signals, the obtained reference signal beam pattern information, and the BPD.

The foregoing and other described implementations can each, optionally, include one or more of the following features:

A first feature, combinable with any of the following features, where receiving or transmitting, between the first and second electronic devices, a plurality of reference signals in accordance with the reference signal beam pattern information: transmitting, by the first electronic device and to the second electronic device, control signals, where the control signals are used to configure reference signals to be transmitted by the second electronic device with a plurality of transmit beam patterns; and measuring, by the first electronic device and using a plurality of receive beam patterns, the reference signals transmitted by the second electronic device with the plurality of transmit beam patterns.

A second feature, combinable with any of the previous or following features, where receiving or transmitting, between the first and second electronic devices, a plurality of reference signals in accordance with the reference signal beam pattern information: transmitting, by the first electronic device and to the second electronic device, control signals, where the control signals are used to configure reference signals to be transmitted by the first electronic device with a plurality of transmit beam patterns; transmitting, by the first electronic device and to the second electronic device, the reference signals with the plurality of transmit beam patterns; and receiving, by the first electronic device and from the second electronic device, beam measurement results, where the beam measurement results are measured, by the second electronic device and using a plurality of receive beam patterns, on the reference signals transmitted by the first electronic device with the plurality of transmit beam patterns.

A third feature, combinable with any of the previous or following features, where the BPD includes a plurality of entries, and each of the plurality of entries includes at least one of a beam index, a beam peak direction, or a beam peak gain.

A fourth feature, combinable with any of the previous or following features, where determining, by the first electronic device, the environment information surrounding the first electronic device and the second electronic device comprises: determining that an obstacle exists in a direction of the first electronic device between the first electronic device and the second electronic device.

A fifth feature, combinable with any of the previous or following features, where the first electronic device includes one of a smart TV, a router, and a smart speaker, the second electronic device includes one of a smartphone and a tablet, and the first electronic device and the second electronic device are stationary when obtaining the reference signal beam pattern information and determining the environment information.

A sixth feature, combinable with any of the previous or following features, where the first electronic device communicates with the second electronic device through device-to-device (D2D) communication.

In a second implementation, a first electronic device includes: a non-transitory memory storage comprising instructions; and one or more hardware processors in communication with the memory storage, where the one or more hardware processors execute the instructions to perform operations comprising: obtaining reference signal beam pattern information associated with a plurality of beam directions of a second electronic device, that is then stored in a beam pattern database (BPD) in the first electronic device, receiving or transmitting, between the first and second electronic devices, a plurality of reference signals in accordance with the reference signal beam pattern information, and determining environment information surrounding the first electronic device and the second electronic device based on measurements of the reference signals, the obtained reference signal beam pattern information, and the BPD.

The foregoing and other described implementations can each, optionally, include one or more of the following features:

A first feature, combinable with any of the following features, where receiving or transmitting, between the first and second electronic devices, a plurality of reference signals in accordance with the reference signal beam pattern information: transmitting, to the second electronic device, control signals, where the control signals are used to configure reference signals to be transmitted by the second electronic device with a plurality of transmit beam patterns; and measuring, using a plurality of receive beam patterns, the reference signals transmitted by the second electronic device with the plurality of transmit beam patterns.

A second feature, combinable with any of the previous or following features, where receiving or transmitting, between the first and second electronic devices, a plurality of reference signals in accordance with the reference signal beam pattern information: transmitting, to the second electronic device, control signals, where the control signals are used to configure reference signals to be transmitted by the first electronic device with a plurality of transmit beam patterns; transmitting, to the second electronic device, the reference signals with the plurality of transmit beam patterns; and receiving, from the second electronic device, beam measurement results, where the beam measurement results are measured, by the second electronic device and using a plurality of receive beam patterns, on the reference signals transmitted by the first electronic device with the plurality of transmit beam patterns.

A third feature, combinable with any of the previous or following features, where the BPD includes a plurality of entries, and each of the plurality of entries includes at least one of a beam index, a beam peak direction, or a beam peak gain.

A fourth feature, combinable with any of the previous or following features, where determining the environment information surrounding the first electronic device and the second electronic device comprises: determining that an obstacle exists in a direction of the first electronic device between the first electronic device and the second electronic device.

A fifth feature, combinable with any of the previous or following features, where the first electronic device includes one of a smart TV, a router, and a smart speaker, the second electronic device includes one of a smartphone and a tablet, and the first electronic device and the second electronic device are stationary when obtaining the reference signal beam pattern information and determining the environment information.

A sixth feature, combinable with any of the previous or following features, where the first electronic device communicates with the second electronic device through device-to-device (D2D) communication.

In a third implementation, a non-transitory computer-readable medium storing computer instructions, that when executed by one or more hardware processors, cause the one or more hardware processors to perform operations including: obtaining, by a first electronic device, reference signal beam pattern information associated with a plurality of beam directions of a second electronic device, that is then stored in a beam pattern database (BPD) in the first electronic device, receiving or transmitting, between the first and second electronic devices, a plurality of reference signals in accordance with the reference signal beam pattern information, and determining, by the first electronic device, environment information surrounding the first electronic device and the second electronic device based on measurements of the reference signals, the obtained reference signal beam pattern information, and the BPD.

The foregoing and other described implementations can each, optionally, include one or more of the following features:

A first feature, combinable with any of the following features, where receiving or transmitting, between the first and second electronic devices, a plurality of reference signals in accordance with the reference signal beam pattern information: transmitting, by the first electronic device and to the second electronic device, control signals, where the control signals are used to configure reference signals to be transmitted by the second electronic device with a plurality of transmit beam patterns; and measuring, by the first electronic device and using a plurality of receive beam patterns, the reference signals transmitted by the second electronic device with the plurality of transmit beam patterns.

A second feature, combinable with any of the previous or following features, where receiving or transmitting, between the first and second electronic devices, a plurality of reference signals in accordance with the reference signal beam pattern information: transmitting, by the first electronic device and to the second electronic device, control signals, where the control signals are used to configure reference signals to be transmitted by the first electronic device with a plurality of transmit beam patterns; transmitting, by the first electronic device and to the second electronic device, the reference signals with the plurality of transmit beam patterns; and receiving, by the first electronic device and from the second electronic device, beam measurement results, where the beam measurement results are measured, by the second electronic device and using a plurality of receive beam patterns, on the reference signals transmitted by the first electronic device with the plurality of transmit beam patterns.

A third feature, combinable with any of the previous or following features, where the BPD includes a plurality of entries, and each of the plurality of entries includes at least one of a beam index, a beam peak direction, or a beam peak gain.

A fourth feature, combinable with any of the previous or following features, where determining, by the first electronic device, the environment information surrounding the first electronic device and the second electronic device comprises: determining that an obstacle exists in a direction of the first electronic device between the first electronic device and the second electronic device.

A fifth feature, combinable with any of the previous or following features, where the first electronic device includes one of a smart TV, a router, and a smart speaker, the second electronic device includes one of a smartphone and a tablet, and the first electronic device and the second electronic device are stationary when obtaining the reference signal beam pattern information and determining the environment information.

A sixth feature, combinable with any of the previous or following features, where the first electronic device communicates with the second electronic device through device-to-device (D2D) communication.

In a fourth implementation, a method includes: determining, by a second electronic device, indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

The foregoing and other described implementations can each, optionally, include one or more of the following features:

A first feature, combinable with any of the following features, where the first electronic device stores a beam pattern database (BPD) that includes beam pattern information.

A second feature, combinable with any of the previous or following features, where the BPD includes a plurality of entries, and each of the plurality of entries includes at least one of a beam index, a beam peak direction, or a beam peak gain.

In a fifth implementation, a second electronic device includes: a non-transitory memory storage comprising instructions; and one or more hardware processors in communication with the memory storage, where the one or more hardware processors execute the instructions to perform operations comprising: determining indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

The foregoing and other described implementations can each, optionally, include one or more of the following features:

A first feature, combinable with any of the following features, where the first electronic device stores a beam pattern database (BPD) that includes beam pattern information.

A second feature, combinable with any of the previous or following features, where the BPD includes a plurality of entries, and each of the plurality of entries includes at least one of a beam index, a beam peak direction, or a beam peak gain.

In a sixth implementation, a non-transitory computer-readable medium storing computer instructions, that when executed by one or more hardware processors, cause the one or more hardware processors to perform operations including: determining, by a second electronic device, indication information indicating a plurality of beam directions of the second electronic device for receiving or transmitting between a first electronic device and the second electronic device; receiving or transmitting, between the first and second electronic devices, the indication information indicating the plurality of beam directions of the second electronic device; and receiving or transmitting, between the first and second electronic devices, a plurality of reference signals in accordance with the plurality of beam directions of the second electronic device.

The foregoing and other described implementations can each, optionally, include one or more of the following features:

A first feature, combinable with any of the following features, where the first electronic device stores a beam pattern database (BPD) that includes beam pattern information.

A second feature, combinable with any of the previous or following features, where the BPD includes a plurality of entries, and each of the plurality of entries includes at least one of a beam index, a beam peak direction, or a beam peak gain.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a Command Line Interface (CLI) that processes information and efficiently presents the information results to the user. In general, a GUI may include a plurality of User Interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   obtaining, by a first electronic device, reference signal beam pattern information associated with a plurality of beam directions of a second electronic device, the reference signal beam pattern information stored in a beam pattern database (BPD) in the first electronic device;
   receiving or transmitting, between the first electronic device and the second electronic device, a plurality of reference signals in accordance with the reference signal beam pattern information; and
   determining, by the first electronic device, environment information surrounding the first electronic device and the second electronic device based on measurements of the reference signals, the reference signal beam pattern information, and the BPD.

2. The computer-implemented method according to claim 1, wherein receiving or transmitting, between the first electronic device and the second electronic device, the plurality of reference signals in accordance with the reference signal beam pattern information comprises:
   transmitting, by the first electronic device and to the second electronic device, control signals, wherein the control signals are used to configure reference signals to be transmitted by the second electronic device with a plurality of transmit beam patterns; and
   measuring, by the first electronic device and using a plurality of receive beam patterns, the reference signals transmitted by the second electronic device with the plurality of transmit beam patterns.

3. The computer-implemented method according to claim 1, wherein receiving or transmitting, between the first electronic device and the second electronic device, the plurality of reference signals in accordance with the reference signal beam pattern information comprises:
   transmitting, by the first electronic device and to the second electronic device, control signals, wherein the control signals are used to configure reference signals to be transmitted by the first electronic device with a plurality of transmit beam patterns;
   transmitting, by the first electronic device and to the second electronic device, the reference signals with the plurality of transmit beam patterns; and
   receiving, by the first electronic device and from the second electronic device, beam measurement results, wherein the beam measurement results are measured, by the second electronic device and using a plurality of receive beam patterns, on the reference signals transmitted by the first electronic device with the plurality of transmit beam patterns.

4. The computer-implemented method according to claim 1, wherein the BPD includes a plurality of entries, and each of the plurality of entries includes at least one of a beam index, a beam peak direction, or a beam peak gain.

5. The computer-implemented method according to claim 1, wherein determining, by the first electronic device, the environment information surrounding the first electronic device and the second electronic device comprises:
determining that an obstacle exists in a direction of the first electronic device between the first electronic device and the second electronic device.

6. The computer-implemented method according to claim 1, wherein the first electronic device includes one of a smart TV, a router, and a smart speaker, the second electronic device includes one of a smartphone and a tablet, and the first electronic device and the second electronic device are stationary when obtaining the reference signal beam pattern information and determining the environment information.

7. The computer-implemented method according to claim 1, wherein the first electronic device communicates with the second electronic device through device-to-device (D2D) communication.

8. A first electronic device comprising:
a non-transitory memory storage comprising instructions; and
one or more hardware processors in communication with the non-transitory memory storage, wherein the one or more hardware processors execute the instructions to cause the first electronic device to perform operations comprising:
obtaining reference signal beam pattern information associated with a plurality of beam directions of a second electronic device, the reference signal beam pattern information stored in a beam pattern database (BPD) in the first electronic device;
receiving or transmitting, between the first electronic device and the second electronic device, a plurality of reference signals in accordance with the reference signal beam pattern information; and
determining environment information surrounding the first electronic device and the second electronic device based on measurements of the reference signals, the reference signal beam pattern information, and the BPD.

9. The first electronic device according to claim 8, wherein receiving or transmitting, between the first electronic device and the second electronic device, the plurality of reference signals in accordance with the reference signal beam pattern information comprises:
transmitting, to the second electronic device, control signals, wherein the control signals are used to configure reference signals to be transmitted by the second electronic device with a plurality of transmit beam patterns; and
measuring, using a plurality of receive beam patterns, the reference signals transmitted by the second electronic device with the plurality of transmit beam patterns.

10. The first electronic device according to claim 8, wherein receiving or transmitting, between the first electronic device and the second electronic device, the plurality of reference signals in accordance with the reference signal beam pattern information comprises:
transmitting, to the second electronic device, control signals, wherein the control signals are used to configure reference signals to be transmitted by the first electronic device with a plurality of transmit beam patterns;
transmitting, to the second electronic device, the reference signals with the plurality of transmit beam patterns; and
receiving, from the second electronic device, beam measurement results, wherein the beam measurement results are measured, by the second electronic device and using a plurality of receive beam patterns, on the reference signals transmitted by the first electronic device with the plurality of transmit beam patterns.

11. The first electronic device according to claim 8, wherein the BPD includes a plurality of entries, and each of the plurality of entries includes at least one of a beam index, a beam peak direction, or a beam peak gain.

12. The first electronic device according to claim 8, wherein determining the environment information surrounding the first electronic device and the second electronic device comprises:
determining that an obstacle exists in a direction of the first electronic device between the first electronic device and the second electronic device.

13. The first electronic device according to claim 8, wherein the first electronic device includes one of a smart TV, a router, and a smart speaker, the second electronic device includes one of a smartphone and a tablet, and the first electronic device and the second electronic device are stationary when obtaining the reference signal beam pattern information and determining the environment information.

14. The first electronic device according to claim 8, wherein the first electronic device communicates with the second electronic device through device-to-device (D2D) communication.

15. A computer-implemented method comprising:
determining, by a second electronic device, indication information indicating a plurality of beam directions of the second electronic device for receiving or transmitting between a first electronic device and the second electronic device;
transmitting, by the second electronic device to the first electronic device, the indication information indicating the plurality of beam directions of the second electronic device; and
receiving or transmitting, by the second electronic device from the first electronic device or to the first electronic device, a plurality of reference signals in accordance with the plurality of beam directions of the second electronic device.

16. The computer-implemented method according to claim 15, wherein the first electronic device stores a beam pattern database (BPD) that includes beam pattern information.

17. The computer-implemented method according to claim 16, wherein the BPD includes a plurality of entries, and wherein each of the plurality of entries includes at least one of a beam index, a beam peak direction, or a beam peak gain.

18. A second electronic device comprising:
a non-transitory memory storage comprising instructions; and
one or more hardware processors in communication with the non-transitory memory storage, the one or more hardware processors configured to execute the instructions to cause the second electronic device to perform operations comprising:
determining indication information indicating a plurality of beam directions of the second electronic device for receiving or transmitting between a first electronic device and the second electronic device;
transmitting, to the first electronic device, the indication information indicating the plurality of beam directions of the second electronic device; and receiving or transmitting, from the first electronic device or to the first electronic device, a plurality of reference signals in accordance with the plurality of beam directions of the second electronic device.

19. The second electronic device according to claim 18, wherein the first electronic device stores a beam pattern database (BPD) that includes beam pattern information.

20. The second electronic device according to claim 19, wherein the BPD includes a plurality of entries, and wherein each of the plurality of entries includes at least one of a beam index, a beam peak direction, or a beam peak gain.

21. The computer-implemented method according to claim 15, the indication information indicating the plurality of beam directions of the second electronic device for device-to-device (D2D) communication between the first electronic device and the second electronic device.

* * * * *